E. E. TAEUBERT.
ELECTRIC GENERATOR GOVERNOR.
APPLICATION FILED OCT. 23, 1917.
1,316,466.
Patented Sept. 16, 1919.
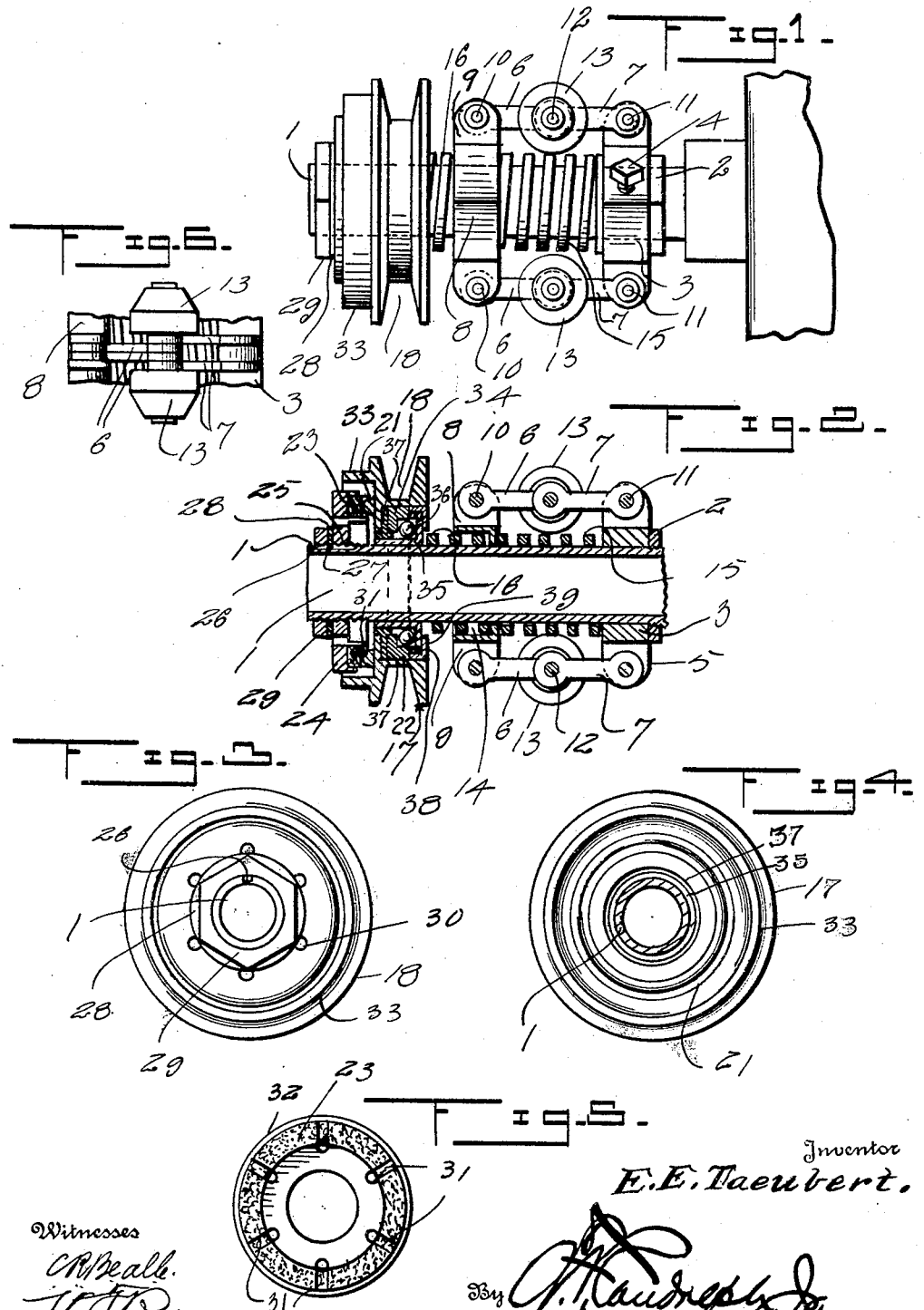
Inventor
E. E. Taeubert.
Witnesses

UNITED STATES PATENT OFFICE.

EDMUND E. TAEUBERT, OF LOS ANGELES, CALIFORNIA, ASSIGNOR TO LEO M. HARVEY, OF LOS ANGELES, CALIFORNIA.

ELECTRIC-GENERATOR GOVERNOR.

1,316,466.  Specification of Letters Patent.  Patented Sept. 16, 1919.

Application filed October 23, 1917. Serial No. 198,062.

*To all whom it may concern:*

Be it known that I, EDMUND E. TAEUBERT, a citizen of the United States, residing at Los Angeles, in the county of Los Angeles and State of California, have invented certain new and useful Improvements in Electric-Generator Governors; and I do hereby declare the following to be a full, clear, and exact description of the invention, such as will enable others skilled in the art to which it appertains to make and use the same.

The invention relates to a governor for electric generators.

The object of the present invention is to provide a simple, practical and efficient governor for electric generators adapted to be readily applied to the generators of motorcycles and other vehicles and which will be simple and reliable and require little adjustment and care in its maintenance.

It is also an object of the invention to provide a governor of this character in which the pressure and drag will not materially vary with use, but will remain permanent and constant from start to finish of the life of a friction disk.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawing:

Figure 1 is a side elevation of an electric generator governor constructed in accordance with this invention.

Fig. 2 is a longitudinal sectional view of the same.

Fig. 3 is an end elevation.

Fig. 4 is a transverse sectional view, the pulley member being shown in elevation.

Fig. 5 is a detail view of the friction disk.

Fig. 6 is a detail view of the links and the weights.

Like numerals of reference designate corresponding parts in the several figures of the drawings.

In the accompanying drawings, in which is illustrated the preferred embodiment of the invention, the electric generator governor comprises in its construction a shaft 1 designed to be connected to the armature of the generator and provided at the outer end with a threaded collar or flange 2 and having secured to it, adjacent to the said collar or flange, a polygonal collar 3 detachably clamped to the shaft 1 by a set screw 4. The polygonal collar is provided with opposite arms 5 and is connected by inner and outer links 6 and 7 with a slidable collar 8 having opposite arms 9. The links are connected to the arms of the collars by suitable pivots 10 and 11 and they are connected together at their contiguous ends by pivots 12 which carry weights 13 located at opposite sides of the links which are arranged in pairs, as clearly shown in Fig. 6 of the drawing. The slidable collar 8 is provided with an interior annular groove 14 and a coiled spring 15 is disposed on the shaft and is interposed between the sliding collars 3 and 8, while a second coiled spring 16 is interposed between the sliding collar 8 and a pulley member 17. The pulley member 17, which is grooved at its periphery as shown at 18 to receive a belt for connecting it to a suitable engine, motor or the like, is equipped with an annular friction ring or flange 21 and it is provided with a suitable bearing 22 which is preferably a ball bearing. The friction ring, which is tapered cross-sectionally, is approximately semi-circular in cross-section and, while it may be constructed of any suitable material, copper has been found exceedingly advantageous as it will produce a good friction surface and at the same time rapidly dissipate heat.

The friction ring or flange of the pulley member coacts with a lining 23 of a friction disk 24 constructed of suitable metal and interiorly threaded at 25 to screw on the threaded end of the shaft 1, and the latter is provided with a groove 26 which is engaged by a lug 27 of a locking washer 28 located between the friction disk and the nut 29, and adapted to prevent the latter from unscrewing. The friction disk, which is provided with perforations 30, carries the lining 23 which is constructed of brake lining material of the ordinary construction and it is in the form of a ring and is provided at intervals with radially arranged grooves 31 adapted to permit dust and grit to accumulate in them to keep the friction surfaces clear of such dust and dirt. The friction disk is provided at its periphery with an annular flange 32 and the ring or lining of the brake disk is retained within the annular flange. The lining of the friction disk may be readily removed and replaced or a new friction disk may be substituted for an old one when the latter becomes saturated with grease or otherwise rendered useless. This may be effected at a very low cost and the governor can be maintained in perfect condition and will require but little attention. The centrifugally operable means, comprising the weights 13, the links, and the springs, will automatically maintain the generator at a predetermined speed, and, when the speed of the commutator increases beyond a predetermined number of revolutions, the weights will be thrown outwardly by centrifugal force and will relieve the pulley member of spring pressure and thereby prevent such excessive speed and when the rotation of the shaft decreases to the required speed, the weights will move inwardly and permit the pulley member to reëngage the friction disk. The tension of the springs may be readily varied by loosening the set screw and adjusting the threaded flange or nut 2 and, after an adjustment of the springs, the set screw may be tightened and will maintain the governor in such adjustment. The outer section of the pulley member is provided with an annular flange 33 which extends over and is adapted to protect the friction disk.

The ball bearing may be of any preferred construction, but it is preferable to employ that disclosed in the accompanying drawing, and the said bearing comprises inner and outer flanged bearing members 34 and 35 forming a race for the balls 36. The bearing is provided with packing rings 37 and 38, the packing ring 37 being located between the outer bearing member and the pulley member, and the other packing ring 38 being retained in place by a cap ring 39. The fabric packing, which may be made of felt or any other suitable material, is adapted to exclude the dust and retain the lubricant within the bearing.

What is claimed is:

1. In a device of the character stated, a rotary shaft, an inner collar secured on said shaft for rotation therewith, an outer collar loose on the shaft and freely movable longitudinally of the same, pairs of links pivotally secured at their outer ends to said collars and having their inner ends pivotally secured together, weight members carried by said links at the inner ends thereof, an expansion coil spring mounted about said shaft and confined between said collars for normally forcing the outer collar away from the inner collar, a friction disk secured on said shaft beyond the outer collar, a pulley loosely mounted on the shaft adjacent the inner face of said disk, and an expansion coil spring mounted about the shaft and confined between said pulley and said outer collar.

2. In a device of the character stated, a rotary shaft, an inner collar secured on said shaft for rotation therewith, an outer collar loose on the shaft and freely movable longitudinally of the same, means for forcing the outer collar away from the inner collar, means controlled by the speed of rotation of the shaft for moving said outer collar toward the inner collar, a disk secured on the shaft, a pulley loosely mounted on the shaft adjacent the inner face of said disk, and an expansion coil spring mounted about the shaft and confined between the inner face of said pulley and said outer collar.

In testimony whereof I affix my signature in presence of two witnesses.

EDMUND E. TAEUBERT.

Witnesses:
   JOHN A. JOHNSON,
   MARTHA HOPHAMER.

Copies of this patent may be obtained for five cents each, by addressing the "Commissioner of Patents, Washington, D. C."